United States Patent [19]

Turk

[11] 3,868,203
[45] Feb. 25, 1975

[54] TIRE MOLDING MACHINE
[75] Inventor: Leonard G. Turk, Akron, Ohio
[73] Assignee: NRM Corporation, Akron, Ohio
[22] Filed: Dec. 26, 1973
[21] Appl. No.: 428,140

Related U.S. Application Data
[62] Division of Ser. No. 143,847, May 17, 1971, Pat. No. 3,782,871.

[52] U.S. Cl. ............... 425/242, 156/125, 156/417, 156/420, 156/394, 156/110, 425/46, 425/129, 425/40
[51] Int. Cl. ...... B29h 3/08, B29h 5/02, B29h 17/00, B29f 1/00
[58] Field of Search ............ 425/39, 35, 45, 46, 52, 425/54, 242; 18/42 T

[56] References Cited
UNITED STATES PATENTS

| | | | |
|---|---|---|---|
| 2,476,884 | 7/1949 | Maynard | 18/42 T UX |
| 2,763,317 | 9/1956 | Ostling et al. | 425/52 X |
| 3,337,918 | 8/1967 | Pacciarini et al. | 425/39 |
| 3,396,221 | 8/1968 | Balle et al. | 425/43 X |
| 3,457,594 | 7/1969 | Baudon | 425/35 |
| 3,459,849 | 8/1969 | De Ronde | 425/45 X |
| 3,464,090 | 9/1969 | Cantarutti | 425/46 |
| 3,645,655 | 2/1972 | Beneze | 425/35 |
| 3,703,346 | 11/1972 | Deboeur | 425/46 |

FOREIGN PATENTS OR APPLICATIONS
1,928,829  12/1970  Germany ............................ 425/46

*Primary Examiner*—J. Howard Flint, Jr.
*Attorney, Agent, or Firm*—Donnelly, Maky, Renner & Otto

[57] ABSTRACT

A tire molding machine comprising a core or center mechanism adapted to be expanded radially and converted from a generally cylindrical to a toroidal or tire shape, side wall mold sections and a tread mold section movable into position vis-a-vis such core when in tire shape to form a tire mold cavity, injection means to fill such cavity with an elastomer to be heat cured to form a tire, such core being then collapsed to cylindrical shape and radially contracted while the side wall and tread mold sections are withdrawn to permit removal of the tire.

5 Claims, 6 Drawing Figures

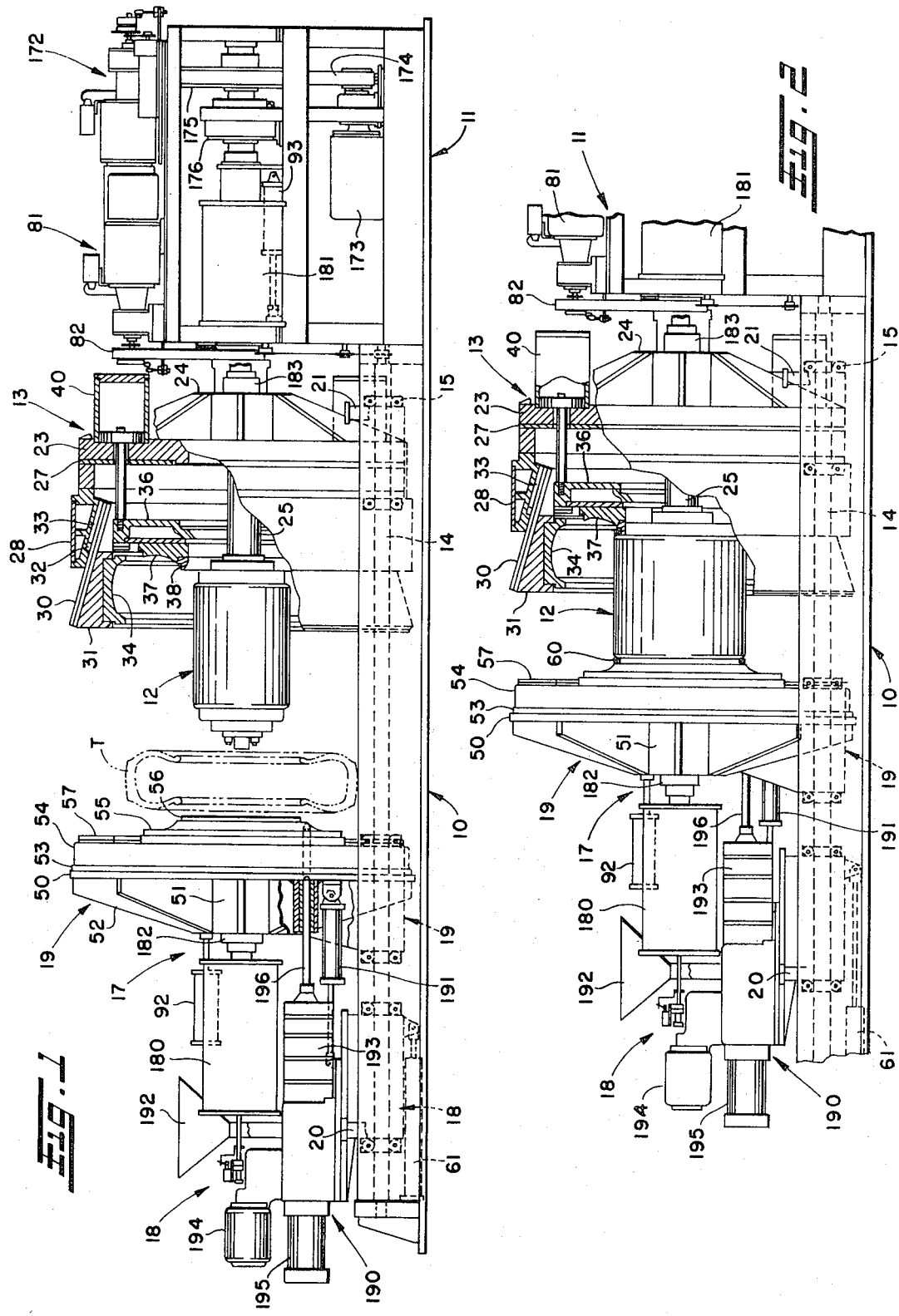

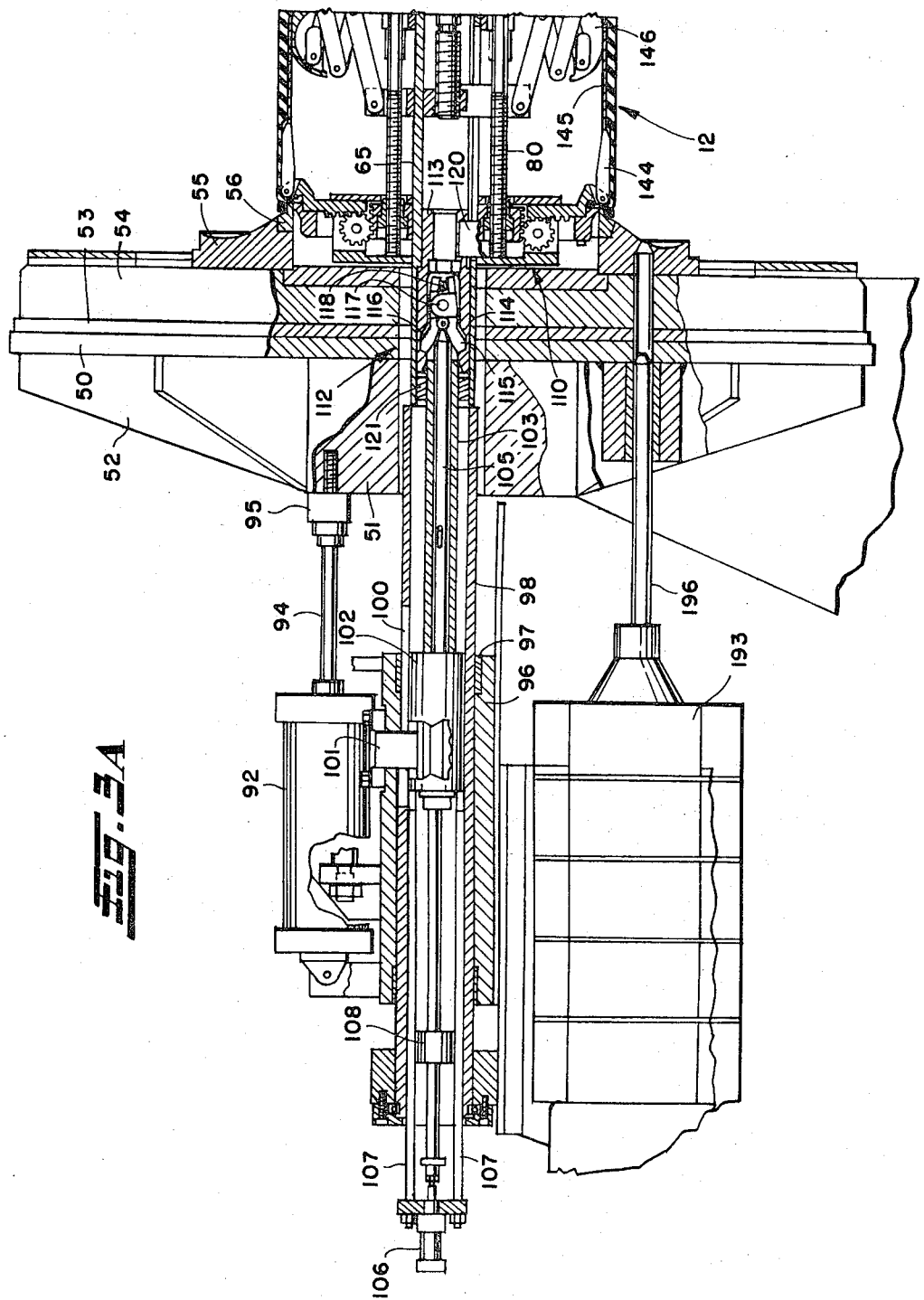

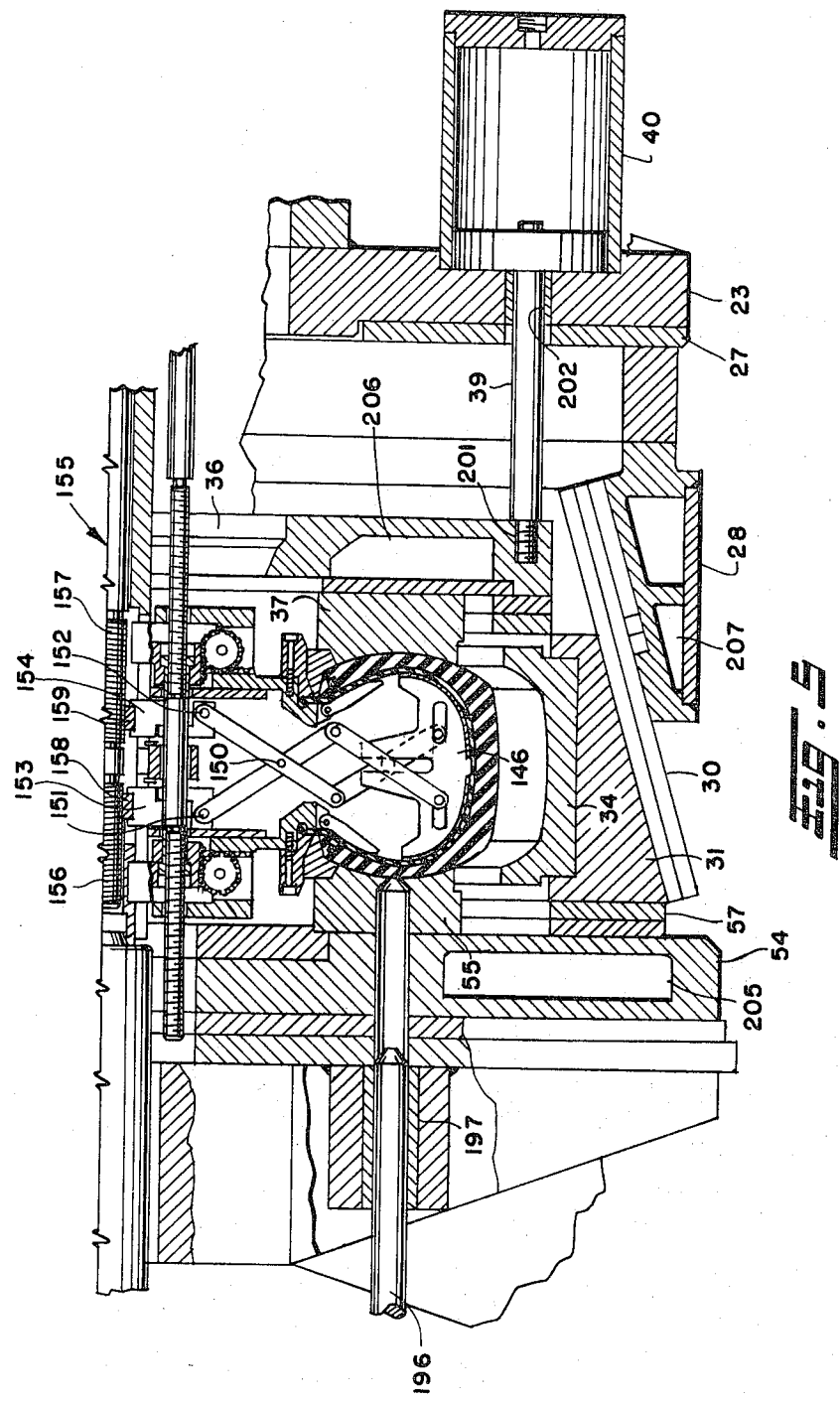

TIRE MOLDING MACHINE

This is a division of application Ser. No. 143,847, filed May 17, 1971 now U.S. Pat. No. 3,782,871.

This invention relates generally as indicated to a tire molding machine and more particularly to a machine for the production of tires having a unique core or center mechanism.

Tires are conventionally made by the construction of a rather elaborate tire carcass usually made on a drum, such carcass being comprised of a plurality of elements such as beads, tire ply materials wrapped around such beads, and tread stock and tire side wall materials applied thereto. The carcass is then positioned in a tire press which through pressure shapes the carcass to tire shape and then heat cures the elasotmeric materials to form a tire. The practical possibility of injection or other type molding of tires has been extremely illusive principally because of the inability to provide a machine which would have a suitable tire shape core to form the tire cavity which could then readily be collapsed for removal of the cured tire from the machine. Most such prior machines have included cores which could not be readily radially expanded nor readily converted to a toroidal or tire shape and then collapsed or contracted to permit removal of the tire from the machine.

With the present invention there is provided a machine utilizing a core which can radially be expanded and then quickly converted to a toroidal or tire shape. There can be applied to the core tire beads or other tire materials such as belts and the like. Tire side wall mold sections and tread mold sections can then be quickly and properly positioned vis-a-vis the expanded core to form a tire cavity. Elastomeric material may then be injected into the cavity or the cavity can be formed about tire materials positioned on the core for the compression or injection molding of the tire in the machine. After the elastomeric materials are heat cured, the side wall mold sections and the tread mold section may be removed and the core collapsed so that the formed tire may readily be removed from the machine.

It is accordingly a principal object of the present invention to provide a tire molding machine utilizing a cylindrical core which can be expanded radially and then converted to toroidal or tire shape to form the interior surface of a tire mold cavity.

Another principal object is the provision of a tire molding machine utilizing a generally cylindrical core which can be converted to a toroidal or tire shape to cooperate with side wall and tread mold sections to form a tire cavity.

Yet another principal object is the provision of a tire making machine for the injection or compression molding of tires utilizing a horizontally disposed core having a substantially rigid surface which can be expanded radially and then converted to generally toroidal or tire shape to form with side wall and tread mold sections a tire cavity.

Other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

In said annexed drawings:

FIG. 1 is a side elevation of a machine in accordance with the present invention, such machine being partially broken away and in section and in open or tire removal condition;

FIG. 2 is a fragmentary side elevation similar to FIG. 1 showing the machine partially closed and the core radially expanded with the beads of the tire to be formed in position;

FIG. 3A is an enlarged fragmentary vertical section of the machine in the condition of FIG. 2;

FIG. 5 is a quarter section similar to FIG. 4 illustrating the cavity partially opened with the tread mold section radially expanded.

THE MACHINE - GENERAL ARRANGEMENT

Figure 3B:
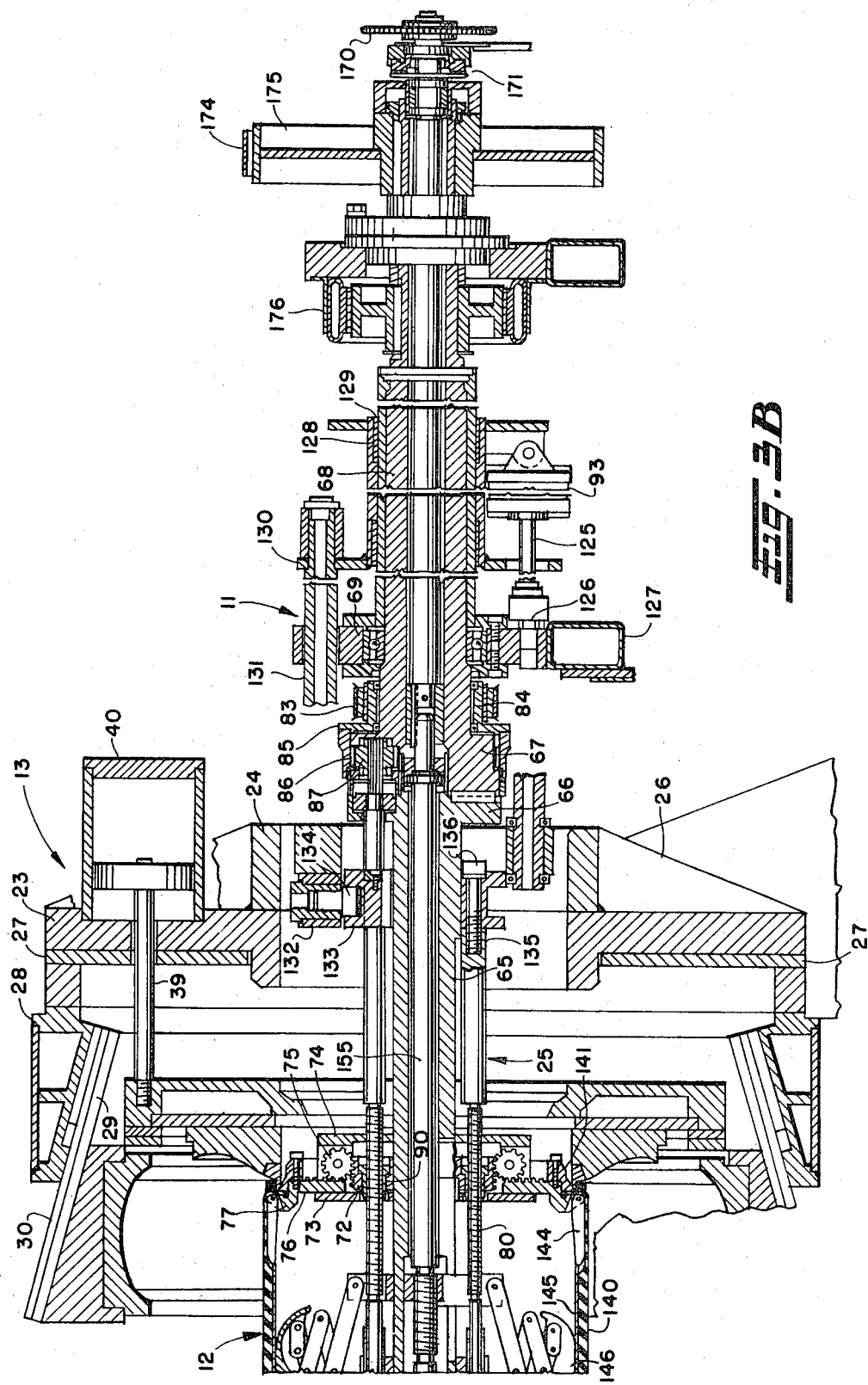
FIG. 3B is a broken continuation of FIG. 3A.

Referring first to FIGS. 1 and 2, it will be seen that the machine is mounted on an elongated base 10, at one end of which is a core drive housing 11. The core 12 driven and controlled from such housing projects in cantilever fashion therefrom through axially movable head stock assembly 13. The head stock assembly is mounted for limited axial movement on laterally spaced rails 14 mounted in the base 10. Rollers indicated generally at 15 support such head stock assembly for movement axially along the base.

At the opposite end of the core 12 there is provided a two part tail stock assembly 17 which includes an outer carriage 18 and an inner carriage 19, both mounted on the base for movement axially of the core in the same manner as the head stock assembly 13. The outer carriage 18 of the tail stock assembly 17 as well as the head stock assembly 13 may be locked to the base by the use of conventional shot pin assemblies seen more clearly at 20 and 21.

The head stock assembly 13 includes a main annular bolster plate 23 having an outwardly projecting hub 24 surrounding the control shaft assembly 25 of the core 12 which projects from the core drive housing 11. A plurality of radially extending gusset plates 26 extend from the hub to the bolster plate 23. An annular plate of insulating material indicated generally at 27 is secured to the interior of the bolster 23 and an annular housing 28 projects axially inwardly therefrom.

The interior of the housing 28 is provided with a plurality of axially inclined T-slots 29, each pair of which has a sliding fit with T's 30 on the exterior of slide blocks or segments 31. There may be approximately eight to a dozen or more such segments mounted in such manner on the interior of the axially projecting housing 28. A stop pin 32 riding in slot 33 limits outward movement of the sectors with respect to the housing 28. On the inside of each block 31 is a tread mold sector 34, such sectors forming the annular tread mold section when the blocks 31 are radially closed.

The head stock assembly 13 also carries annular platen 36 on which is mounted side wall mold section 37 which includes at its radially inner end a bead or toe ring 38. The platen 36 is mounted on the distal ends of rods 39 of piston-cylinder assemblies 40, the cylinders of which are mounted on the exterior of bolster 23. The platen 36 is thus movable with respect to the bolster and normally sufficient pressure will be applied to the blind end of such piston-cylinder assemblies 40 to urge the platen 36 away from the bolster and the tread blocks or sectors radially outward to the extent permitted by the stop pins 32. The head stock assembly 13 thus supports one side wall mold section 37 and the radially expansible tread mold section 34.

The inner carriage 19 of the tail stock assembly 17 includes an annular bolster plate 50 having a rearwardly extending hub 51 with radially extending gusset plates 52 rigidifying the bolster. Annular insulating plate 53 on the front of the bolster plate 50 supports platen 54 to which is secured side wall mold section 55, the inner edge of which includes bead or toe ring 56. The platen 54 includes annular slide plate 57 which butts against the axially projecting ends of the tread mold sector blocks 31.

In FIG. 1, the machine is shown fully opened so that a finished tire T, shown in phantom lines, may be removed from the machine by simply removing the tire from the end of the projecting core 12. In such open position as seen in FIG. 1, after the tire T has been removed, the operator may then place bead rings on the toe rings 56 and 38 if such bead rings are desired in the final tire product. Such bead rings are illustrated at 60 in FIG. 2. With the bead rings in position, the machine may now begin its closing operation which will result in the formation of a substantially perfect tire shape cavity.

The first step in closure is to index the tail stock 17 toward the cantilevered projecting end of the core 12 to close up the space between the inner carriage 19 and the core through which the finished tire is removed. This indexing of the tail stock may be accomplished by a relatively long stroke and small diameter piston-cylinder assembly 61. The initial purpose in indexing the tail stock is to connect such tail stock to the projecting end of the core as seen more clearly in FIG. 3A.

THE CORE

Referring now more particularly to FIGS. 3A and 3B, it will be seen that the core 12 is mounted on a main tubular shaft 65 which is part of the cantilever shaft assembly 25. The shaft 65 is connected through flange 66 to hub 67 of tubular shaft 68 journalled as at 69 in the frame of the core drive housing 11. Rotation of the connected tubular shafts 68 and 65 will cause the entire core to rotate, if desired, for a purpose hereinafter described.

In addition to being rotatable, the core is also capable of radial expansion and contraction as well as conversion to toroidal or tire shape after expansion. A comparison of FIGS. 1 and 2 illustrates the core contracted and radially expanded, respectively. In FIG. 2 the core has, however, not yet been converted to tire or toroidal shape. Radial expansion and contraction of the core is, of course, principally necessary to permit the finished tire T to be removed from the machine. Such expansion characteristic also permits tire materials such as the aforenoted bead rings 60 to be properly positioned in place prior to formation of the tire cavity.

Radial expansion of the core is accomplished by annular racks 72 mounted in each end or shoulder of the core. Such racks are capable of movement between the axially spaced radially extending shoulder walls 73 and 74. In each core and housing as provided by such walls there is mounted a plurality of pinions 75 which, in addition to being in mesh with the annular rack surface of rack 72, are also in mesh with radially extending racks 76 supporting a plurality of core end segments 77. Accordingly, as each annular rack 72 moves axially inwardly, the pinions 75 are caused to rotate and radially shift the racks 76 and accordingly the core end segments 77 move radially outwardly. When the annular racks 72 move axially outwardly, the core ends are accordingly radially retracted. Suitable adjustable stops or limits may be provided precisely to control the position of the core ends both contracted and radially expanded.

Movement of the annular racks is obtained by three shoulder control screws 80, only two of which are shown in the somewhat distorted sectional views of FIGS. 3A and 3B.

Reverting momentarily to FIGS. 1 and 2, it will be seen that on top of the core drive housing 11 there is provided a drive unit 81 which may include a variety of rotational position sensors. Such drive unit 81 drives timing belt 82 which drives timing belt sheave 83 secured to hub 84 journalled on shaft 68. The shoulder drive is thus independent of the shaft 68. The hub 84 includes a radial flange 85 to which is secured internal ring gear 86. Such internal ring gear is in mesh with three pinions 87, spline connected to the respective shoulder control screws 80. Nuts 90, held against rotation and in mesh with the control screws 80, are interposed between such control screws and each annular rack 72. It will be appreciated that the control screws 80 have sections of opposite hand threads at each end as seen by comparing FIGS. 3A and 3B to obtain the desired expansion and movement of the drum ends, the latter hereinafter described.

Normally when the control screws are rotated, the entire drum ends would tend to move toward or away from each other. To resist this movement tendency and thus provide the required reaction to obtain the radial expansion of the drum ends, there is provided shoulder hold pneumatic cylinders 92 and 93 as seen in FIGS. 3A and 3B, respectively. Such shoulder hold cylinders will maintain the drum ends in place during initial rotation of the control screws 80 to obtain the desired drum end expansion. When the annular racks have reached their limit of movement, continued rotation of the control screws 80 will overcome the resistance or drag of the shoulder hold cylinders then permitting the shoulders of the core to move toward each other as the crown of the core is expanded to convert the core from the cylindrical shape shown to a toroidal or tire shape to form the interior of the tire cavity.

The shoulder hold piston-cylinder assembly 92 has its rod 94 anchored at 95 to the hub 51 of the inner carriage 19. Any other suitable anchor for the rod would, however, suffice.

The cylinder portion of the assembly 92 is mounted on a sliding sleeve 96. Suitable bushings 97 are provided to permit the sleeve to slide along tube 98 which projects horizontally on the tail stock and is aligned with the axis of the core 12. The tube 98 is provided with an elongated axial slot 100 through which extends key 101 connecting the outer sleeve 96 and thus the cylinder of the assembly 92 to a thrust bushing 102 in which is journalled the end of tubular shaft 103. Accordingly, axial movement of the cylinder of the assembly 92 will cause axial movement or exert a pressure of axial movement on the tubular member 103.

A latch rod 105 extends through the tubular member 103 and is actuated by piston-cylinder assembly 106 mounted on the ends of support rods 107 which are anchored in the thrust bushing 102. Actually such latch rod may be of a two part construction, such two parts being interconnected by a thrust bearing 108. The purpose of the latch rod is to connect and disconnect the tail stock from the projecting end of the core 12 and also to connect and disconnect the tubular shaft 103 to the end or shoulder 110 of the core 12 to permit the shoulder hold cylinder assembly 92 to function. Such connection is accomplished through the latch mechanism shown generally at 112.

Such latch mechanism includes a socket member 113 secured in the tubular shaft 65 of the core. Such socket member includes inwardly directed latch recesses 114 which cooperate with pivoted latch members 115 and 116. Such latch members are coaxially pivotally mounted at 117 to the end of the tubular shaft 103 and are urged by compression spring 118 to a retracted or recess clearing position. When the piston-cylinder assembly 106 is extended, extending latch rod 105, the latch members 115 and 116 are pivoted outwardly about the pivot 117 engaging the recesses 114. The socket member 113 is provided with a radially extending key 120 which is secured between the radially extending walls 73 and 74 of the core end. Accordingly, when the tail stock is indexed into position, the tubular shaft 103 telescopes within bronze bushing 121 so that when the piston-cylinder assembly 106 is extended, the cylinder of the assembly 92 will be locked to the drum end holding such shoulder or end in position as the control screws 80 expand the core end through the annular rack, pinions and radially movable segments.

The shoulder hold cylinder assembly 93 is connected to the opposite core end in a slightly different fashion. Referring now to FIG. 3B, it will be seen that the rod 125 of the assembly 93 is anchored at 126 to the frame 127 of the core drive housing 11. The cylinder of the assembly 93 is mounted on sleeve 128 provided with bushings 129 at opposite ends so that such sleeve is slidably mounted on the tubular shaft 68. A bracket 130 extends from the sleeve locking the sleeve to tubular rod 131. Such rod is connected to annular frame 132 which is in turn connected to rotatable annular member 133 through the radially extending roller connection shown at 134. Rods 135 connected to the annular member 133 by the fasteners 136 then are connected directly to the end wall structure 74 of the core end or shoulder.

The core 12 is constructed in such a manner as to be converted in a precisely controlled fashion from the cylindrical shape to a toroidal or tire shape. The surface of the core may include a relatively stiff yet elastic material 140. The beaded annular ends of the elastic material 140 extend over the shoulder provided by the shoulder segments 77 and are secured between such segments and pilot ring segments 141. Such pilot ring segments have an exterior surface shaped to provide a pilot guide for the toe rings as they move axially toward the end of the radially expanded core. Beneath the elastic outer covering of the core there is provided a multiplicity of metallic elements which provide a firm undersurface for the core both in its cylindrical and its expanded or toroidal shape. Pivoted to each of the shoulder segments is a metallic hinge member 144, each such hinge member being provided with a slot to receive in a slidable fit axially extending flexible metallic strip 145. Each metallic strip is secured to one side of a respective crown element 146. Reading from left to right in FIGS. 3A and 3B there will be a shoulder element, hinge element hingedly connected to the shoulder element, flexible metallic strip 145 slidably connected to the hinge element and secured to the crown segment 146, another strip 145 and hinge element, interconnected in the same manner with the latter hingedly connected to the opposite shoulder segment. The illustrated metallic elements form circumferentially of the core a metallic continuum when the core is in its smallest condition as seen in FIG. 1.

Figure 4:
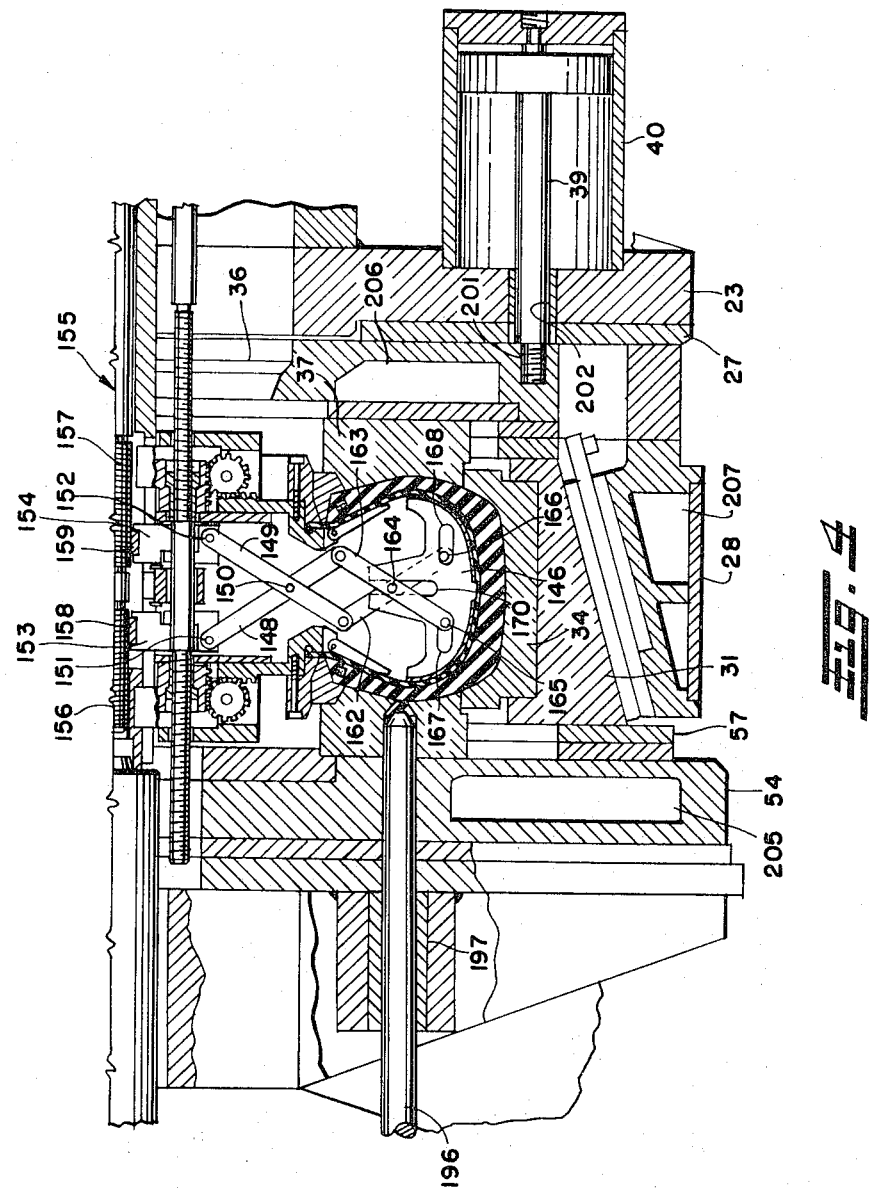
FIG. 4 is an enlarged fragmentary quarter section of the machine illustrating the tire cavity thus formed.

The crown segments 146 are supported for movement radially of the core by the double scissors or X linkage seen perhaps more clearly in FIGS. 4 and 5. Each linkage system includes an inner pair of crossed links 148 and 149 pivotally connected to each other at 150. The inner or proximal end of each link is pivoted at 151 and 152 to circular frames 153 and 154, respectively. Such circular frames are mounted on center control screw 155 which has opposite hand thread portions 156 and 157 in mesh with nuts 158 and 159 positioned in the frames 153 and 154, respectively. Such circular frames are provided with apertures through which the control screws 80 freely fit without interference. Pivoted to the outer ends of the inner pair of links 148 and 149 are a second pair of links 162 and 163. Such links are pivotally connected to each other at 164. The outer ends of the outer pair of links are provided with rollers indicated at 165 and 166 which are mounted in axially extending slots 167 and 168 in the crown segment 146. Such crown segment is also provided with a radially extending slot 170.

The radially extending slot accommodates guide rollers extending axially of the pivots 164 and 150 which interconnect the two pair of crossed links. In the collapsed or cylindrical condition of the core both such rollers will be within the slot while in the extended or tire condition of the core only the roller projecting from the pivot 164 will be within the slot. The slot construction in the crown segments maintains the crown segments properly oriented with respect to the rest of the core. The crown segments are in the shape of a tire crown and as the core expands by rotation of the central control screw 155, the flexible metallic strips 145 extending between the hinge elements 144 and the crown segments will wrap around the exterior surface of the crown segments. It is also noted that in tire shape, the strips have telescoped into the hinge elements. This is accomplished as the distance between the end of the hinge elements and the crown edge shortens.

As seen in FIG. 3B, the central control screw 155 for the drive of the crown segments is journalled within the shaft elements 65 and 68. Such screw shaft is driven through sprocket 170 secured to the outer end thereof as seen in FIG. 3B. A drag brake 171 associated with the sprocket prevents overtravel of the shaft. The sprocket 170 is driven from a core crown drive motor 172 on the top of the core drive housing 11 as seen in FIG. 1. Again such drive for the core crown may include rotational position sensors so that the crown may be expanded radially in synchronism with the axial inward movement of the core shoulders or ends. If it is desired to rotate the core this may be accomplished through core rotation drive motor 173 as seen in FIG.

1, such drive motor driving belt 174 trained about belt sheave 175 keyed to the tubular shaft 68. An inner brake or clutch indicated at 176 in FIG. 3B may be employed in connection with the rotational drive 173 precisely to control the rotation of the core. Rotation of the core may be desirable prior to the closing of the side wall and tread mold sections about the core for the application of special tire elements such as tread stock, reinforcing belts, or reinforcing fabric.

The closing of the side wall mold sections about the core as it expands or following its expansion is accomplished by a pair of relatively large clamp piston-cylinder assemblies as indicated at 180 and 181 in FIG. 1, one of each pair being on laterally opposite sides of the machine. The rods of such clamp cylinders may be connected at 182 and 183 to the hubs of the frames supporting the tail stock inner carriage 19 and the head stock bolster 23. The cylinders of such assemblies may be mounted on the tail stock outer carriage and the frame of the core drive housing, respectively. When the tail stock is in its inner position, the tail stock outer carriage will be locked to the rails 14 and extension of the clamp cylinders 180 will move the tail stock inner carriage with respect to the tail stock outer carriage. Similarly, the clamp cylinders 181 will cause the head stock 13 to move axially toward the tail stock and with respect to the fixed core drive housing 11.

When the tire cavity is formed by conversion of the core to toroidal shape and the movement of the side wall mold sections toward each other, the final movement of the mold section 37 or the head stock 13 radially closing the tread mold section 34, a pair of injection molding machines shown generally at 190, one on each side of the tail stock, are indexed into position for injection through retraction of index cylinder assemblies 191.

Such injection molding machines may be of a generally conventional variety and include hoppers 192 for the feed of raw material. Preferably such injection molding machines are of the reciprocating screw type wherein a screw in heated barrel 193 is rotated to plasticize the raw material, such rotation being obtained by drive motor 194. As the screw rotates, it prepares a shot of plasticized material in front of it and the screw backs off retracting hydraulic cylinder 195. When the shot is prepared for injection, the piston of the assembly 195 indexes forward forcing the plasticized material through lance or nozzle 196 into the mold cavity. As seen perhaps more clearly in FIG. 4, the tip of the lance or nozzle will be positioned adjacent the cavity by the index cylinder assembly 191. Such injection molding machines are mounted for sliding movement on the outer tail stock carriage and may be locked in injection position when properly indexed. To accommodate the lance or nozzle for sliding indexing movement, there is provided a relatively large sleeve bushing indicated at 197 in the inner tail stock carriage.

OPERATION

Referring initially to FIG. 1, the machine is shown in its open condition and the previously produced tire T may be removed between the projecting end of the core 12 and the inner carriage 19 of the tail stock 17. In such position the tail stock is shown in its fully retracted position. Also in such position the head stock 13 has been retracted by the clamp piston-cylinder assemblies 181 automatically radially opening the tread mold sectors 34. The operator may now place bead rings on the toe rings 56 and 38.

Referring now to FIG. 2, the first step in the closing of the machine is accomplished by the radial shoulder expansion of the core 12. This is, of course, done after the tail stock has moved into position against the projecting end of the core and the shoulder hold piston-cylinder assembly 92 is connected to the end of the core through the latch mechanism 112 held in its locking condition by the piston-cylinder assembly 106. With the shoulder hold cylinder assemblies 92 and 93 exerting a predetermined axially outward force on the ends of the core, the shoulder drive 81 is utilized to rotate the three control screws 80 which through the nuts 90 in mesh with the opposite hand threads on such screws move the annular racks 72 axially inwardly to move the shoulder segments 76 radially outwardly through the plurality of pinions 75. This positions the shoulder of the core opposite the toe rings 56 and 38 of the side wall mold sections to be engaged thereby as seen in FIGS. 3A and 3B.

When the core is thus expanded, the side wall mold sections may be brought into position bearing thereagainst by initial operation of the clamp piston-cylinder assemblies 180 and 181. Now with the tail stock locked in position through a shot pin assembly 20, the core is converted to toroidal shape by operation of both the control screws 80 and the center control screw 155 through the respective drives 81 and 172. The control screws 80 overcome the force exerted by the shoulder hold cylinders 92 and 93 causing the entire core ends to move toward each other as the crown segments 146 are radially expanded by operation of the crown control screw 155.

As such shoulders or ends of the core move toward each other, the piston-cylinder assemblies 92 and 93 will retract with the cylinders moving axially along the extending rods thereof. As the shoulders of the core move toward each other and the crown moves radially outwardly, the side wall mold sections follow through extension of the clamp piston-cylinder assemblies 180 and 181.

As illustrated perhaps more clearly in FIGS. 4 and 5 when the side wall mold sections 55 and 37 have achieved their final position vis-a-vis the core with the latter converted to toroidal shape, the tread mold sections 34 are still not yet in position to complete the tire cavity.

The axially projecting end faces of the blocks 31 will initially abut against annular slide plate 57 precluding further axial movement of the tread mold sectors 34. At the time of such abutment, the side wall mold sections 55 and 37 are in their final position. The piston rods 39 of the piston-cylinder assemblies 40 are secured at 201 to platen 36 on which the side wall mold section 37 is mounted. Such rods 39 extend through bushings 202 in bolster 23. There is accordingly permitted relative movement between the platen 36 or the side wall mold section 37 and the bolster 23 which is moved by the relatively large clamp piston-cylinder assemblies 181.

As previously indicated, air pressure is normally provided on the blind end of the cylinder assemblies 40 to urge the bolster 23 and the platen 36 apart to the maximum extended position. In such position the blocks 31 will be at their radially extended position as seen in FIG. 5. Further extension of the clamp piston-cylinder assemblies 181 will now move the bolster 23 toward the platen 36 or the side wall mold section 37 compressing the air in the cylinder assemblies 40. This causes th annular housing to move axially to the left as seen in FIG. 5 forcing the blocks 31 radially inwardly due to the inclined T and slot connection 30-29. Continued movement of the bolster by extension of the clamp piston-cylinder assemblies 181 will cause the parts to achieve the position in FIG. 4 with the tire cavity now formed and closed.

With the cavity now completed and with any beads, belts or reinforcing structures in place, the injection molding machines 190 are now indexed into position to move the lances 196 thereof through the bushings 197 and into position with the tip or nozzle adjacent the cavity. When in such injection position, the injection molding machine may be locked in place to prevent the injection pressure from overcoming the pressure of the cylinder assembly 191 and to prevent the retraction of the machine.

As is the case in conventional injection molding machines, the shot having previously been prepared by the rotation of the screw, all that need be done is to index the cylinder assembly 195 to inject plastic material into the cavity. As soon as the injection cycle is completed, the injection molding machine is unlocked and the piston-cylinder assembly 191 is extended to retract the lance to the position seen in FIG. 5. Heat may now be applied to the cavity through the circulation of steam or other heating medium through the platens which may be provided with chambers indicated at 205, 206 and 207 for such purpose. It will, of course, be appreciated that heat may be applied to the cavity by other means such as electrical resistance elements or a high frequency field.

After a predetermined cure cycle, the machine will now open. This is first accomplished by retraction of the bolster 23 by retraction of the clamp piston-cylinder assemblies 181. This moves the parts from the relative position shown in FIG. 4 in the closed condition of the cavity to the partially opened conditio- shown in FIG. 5. As the bolster initially withdraws, the force exerted by the piston-cylinder assemblies 40 causes the blocks 31 to move radially outwardly and the tread mold sectors 34 are thus withdrawn radially from the cavity. This permits proper stripping of the tread mold sectors from the tread portion of the formed tire.

Continued retraction of the piston-cylinder assemblies 180 and 181 will withdraw the side wall mold sections from the sides of the cavity permitting the core 12 now to commence conversion to a cylindrical shape. This is accomplished by rotation of the control screws 80 moving the core ends radially outwardly and also by rotation of the center control screw 155 moving the crown segments 146 radially inwardly. Once returned to the cylindrical condition as seen in FIG. 2, the core ends are radially contracted by moving the annular racks axially outwardly. This reduces the diameter of the core to less than the I.D. of the beads of the tire. The tail stock is now unlatched and withdrawn to permit the tire to be extracted axially of the core and through the opening between the projecting end of the core and the inner carriage of the tail stock as seen in FIG. 1.

It can now be seen that there is provided a machine utilizing a unique core or center mechanism enabling the quick formation of a tire cavity as well as the quick stepwise disassembly of the cavity and collapse of the core to permit the finished tire to be removed from the machine.

The embodiments of the invention in which an exclusive property or privilege is claimed are defined as follows:

1. A tire making machine comprising a cylindrical core, side wall mold sections movable axially of said core, said core projecting axially in cantilever fashion from one of said side wall mold sections and being separable from the other of said side wall mold sections to permit the placement of tire components over said core, each side wall mold section including toe rings projecting axially inwardly thereof adapted to support tire components such as bead rings, means operative to expand said core radially from a diameter less than that of said toe rings to a diameter greater than that of said toe rings while maintaining its cylindrical shape to form a shoulder on the ends of said drum adapted to cooperate with said toe rings to retain such bead rings thereon, means operative to convert said core from such cylindrical shape to tire shape to form the interior of a tire cavity when said side wall mold sections have moved axially thereagainst, an elastic yet substantially rigid surface on said core in both the cylindrical and tire shape thereof, and injection means operative to fill the cavity remaining after placement of such components with an elastomeric material.

2. A machine as set forth in claim 1 including a radially movable tread mold section mounted on one side wall mold section, and means operative radially to move said tread mold section when said side wall mold sections are in position to complete such tire cavity.

3. A machine as set forth in claim 2 including axially inclined guide means interconnecting said tread mold section and the side wall mold section on which it is mounted operative to cause such radial movement of said tread mold section.

4. A machine as set forth in claim 1 including clamp cylinders operative to hold said side wall mold sections in proper position vis-a-vis said core when the latter is in tire shape.

5. A machine as set forth in claim 1 including means to apply heat to such cavity to cure a tire therein.

* * * * *